(12) United States Patent
Kang

(10) Patent No.: US 8,102,737 B2
(45) Date of Patent: Jan. 24, 2012

(54) POWER SAVING METHOD FOR OPTICAL DISK DRIVE OF RUGGED ELECTRONIC DEVICE

(75) Inventor: Wen Shih Kang, Hsinchu (TW)

(73) Assignee: MITAC Technology Corp., Hsinchu (TW)

( * ) Notice: Subject to any disclaimer, the term of this patent is extended or adjusted under 35 U.S.C. 154(b) by 478 days.

(21) Appl. No.: 12/204,478

(22) Filed: Sep. 4, 2008

(65) Prior Publication Data
US 2010/0054095 A1 Mar. 4, 2010

(51) Int. Cl.
*G11B 7/00* (2006.01)
*G11B 5/00* (2006.01)

(52) U.S. Cl. ............. 369/30.36; 369/77.21; 369/78; 369/79; 369/47.5

(58) Field of Classification Search ......... 369/75.11, 369/77.21, 78, 79, 29.02, 30.28, 30.42, 30.46, 369/30.48, 30.51–30.53, 30.58, 30.6; 206/470, 206/467, 775, 472, 521
See application file for complete search history.

(56) References Cited

U.S. PATENT DOCUMENTS

| | | | | |
|---|---|---|---|---|
| 6,042,416 | A * | 3/2000 | Lopes | 439/500 |
| 6,179,122 | B1 * | 1/2001 | Moncrief et al. | 206/320 |
| 6,760,570 | B1 * | 7/2004 | Higdon, Jr. | 455/90.3 |
| 6,896,134 | B2 * | 5/2005 | Russell et al. | 206/320 |
| 2002/0067675 | A1 * | 6/2002 | Begley | 369/53.37 |
| 2003/0081934 | A1 | 5/2003 | Kirmuss | |
| 2004/0223420 | A1 * | 11/2004 | Yokota | 369/30.36 |
| 2005/0088937 | A1 * | 4/2005 | Hung | 369/53.2 |
| 2006/0044948 | A1 * | 3/2006 | Hashimoto | 369/29.02 |
| 2006/0077770 | A1 * | 4/2006 | Abe | 369/30.01 |
| 2006/0291350 | A1 * | 12/2006 | Minabe et al. | 369/47.32 |
| 2008/0025544 | A1 * | 1/2008 | Maldonado | 381/334 |
| 2009/0103404 | A1 * | 4/2009 | Chiu | 369/47.5 |
| 2009/0158770 | A1 * | 6/2009 | Cohrs et al. | 62/457.9 |
| 2009/0201636 | A1 * | 8/2009 | Doherty et al. | 361/679.26 |

FOREIGN PATENT DOCUMENTS

| | | |
|---|---|---|
| CN | 1904802 A | 1/2007 |
| DE | 196 36 290 A1 | 3/1997 |
| JP | 56-114132 A | 9/1981 |

* cited by examiner

*Primary Examiner* — Wayne Young
*Assistant Examiner* — Dionne Pendleton
(74) *Attorney, Agent, or Firm* — Apex Juris, pllc; Tracy M. Heims

(57) ABSTRACT

A power saving method for an optical disk drive of a rugged electronic device is described. In the method, whether a watertight lid outside the optical disk drive is in open/closed state is detected by a sensor. When the watertight lid is in the closed state, whether an optical disk exists in the optical disk drive is detected by a read/write head of the optical disk drive. When no optical disk exists, a controller in the rugged electronic device begins to time. When a predetermined time is reached and no optical disk drive start command is received, the controller turns off an electrical connection between a power supply and the optical disk drive. When an optical disk drive start command is received, the controller enables the electrical connection between the power supply and the optical disk drive.

13 Claims, 4 Drawing Sheets

POWER SAVING METHOD FOR OPTICAL DISK DRIVE OF RUGGED ELECTRONIC DEVICE

BACKGROUND OF THE INVENTION

1. Field of the Invention

The present invention relates to power saving method and system for electronic device, and more particularly, to a power saving method and system for an optical disk drive of a rugged electronic device.

2. Description of the Related Art

Generally, an optical disk drive built in a rugged electronic device (such as a portable rugged computer) enters a sleep mode for power saving after a period of idle time. In the sleep mode, the motor of the optical disk drive is shut down to reduce noise and heat, and parts of the electronic components on a circuit board of the optical disk drive also stop working. However, in the sleep mode, some components, for example, a host inference (HI), a random access memory (RAM) arbiter, a microcomputer unit (MCU) inside an integrated circuit (IC), or a dynamic RAM (DRAM) on the circuit board remain in work.

Therefore, how to provide a power saving method and system for the optical disk drive of the rugged electronic device is a problem to be urgently solved.

SUMMARY OF THE INVENTION

To resolve the technical problems mentioned above, the present invention provides a power saving method and system for an optical disk drive of a rugged electronic device. The present invention detects the open/close state of a watertight lid deposed outside the optical disk drive and detect whether an optical disk exists in the optical disk drive, thereby determining to turn off the power supplied to the optical disk drive. Therefore, the optical disk drive will not continue to consuming the power even if it is at an idle mode or standby/sleep mode.

In one aspect of the present invention, a power saving method is applied to an optical disk drive of a rugged electronic device. The rugged electronic device has a watertight lid openably disposed outside the optical disk drive; the optical disk drive is electrically connected to a power switch; the power switch is electrically connected to a power supply; and the rugged electronic device has a controller for confirming whether an optical disk drive start command is received. The method includes the following steps. First of all, detect by a sensor whether the watertight lid is in an open state or a closed state. Also, upon the closed state of the watertight lid, detect whether an optical disk exists in the optical disk drive with a read/write head of the optical disk drive. Then time a predetermined time by the controller when the read/write head confirms that no optical disk exists. Afterwards, send out a first control signal to the power switch by the controller to turn off an electrical connection between the power supply and the optical disk drive after the predetermined time is reached.

In another aspect of the present invention, a power saving system for an optical disk drive of a rugged electronic device includes an optical disk drive, a watertight lid, a sensor, a controller and a power switch. The optical disk drive is disposed on one side of the rugged electronic device, and selectively electrically connected to a power supply of the rugged electronic device; wherein the optical disk drive comprises a read/write head for detecting whether an optical disk exists in the optical disk drive. The watertight lid is openably connected to the rugged electronic device and disposed outside the optical disk drive. The sensor detects a position state of the watertight lid and generates a first detection signal corresponding to a closed state of the watertight lid or a second detection signal corresponding to an open state of that the watertight lid. The controller is electrically connected to the sensor for confirming an optical disk drive start command; wherein upon receipt of the first detection signal for the controller and confirmation that no optical disk exists in the optical disk drive, the controller starts to time and generates a first control signal after a predetermined time is reached. The power switch is electrically connected between the optical disk drive, the power supply and the controller; wherein the power switch turns off an electrical connection between the power supply and the optical disk drive according to the first control signal.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
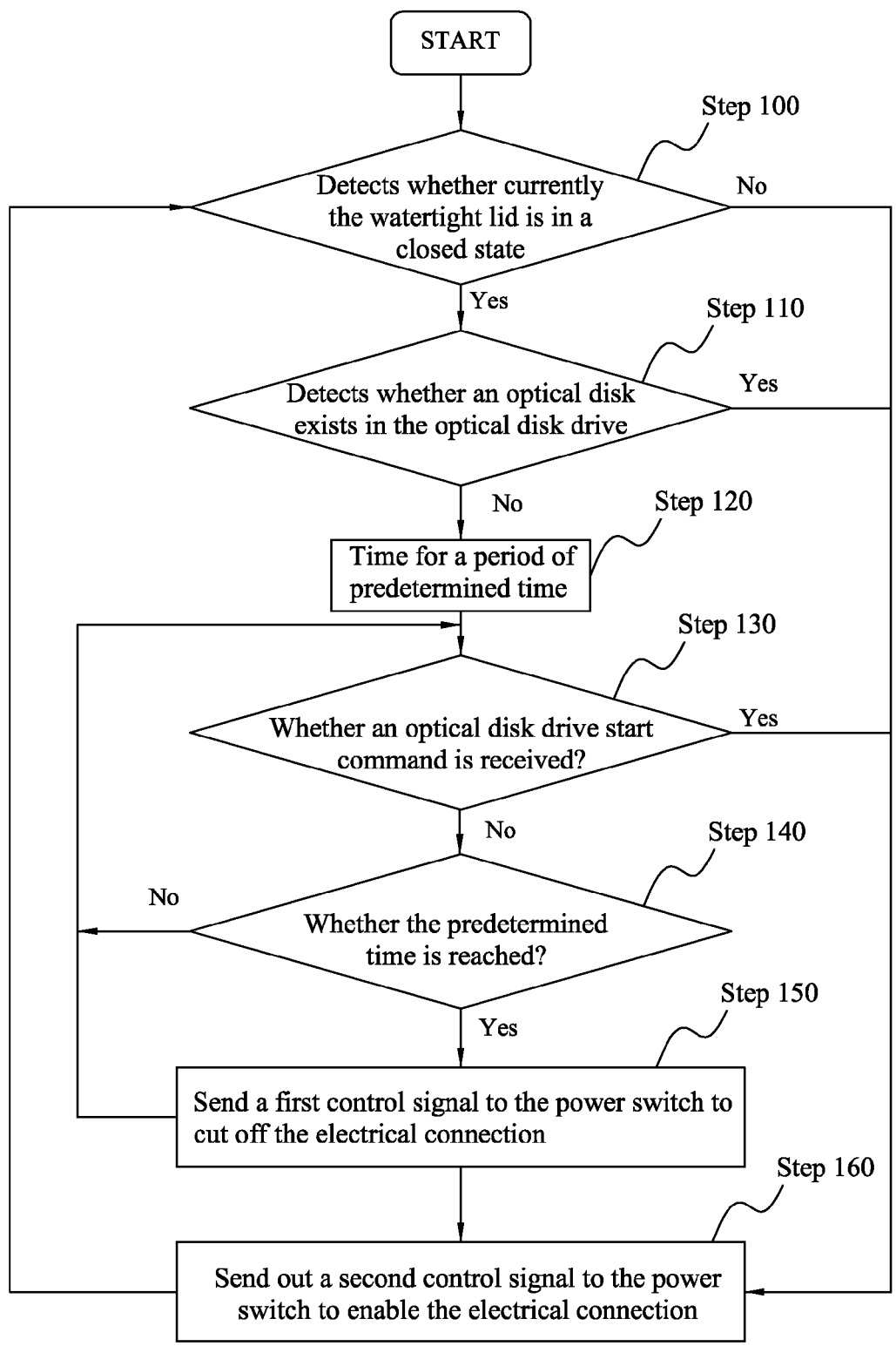
FIG. 1 is a flow chart of a power saving method for an optical disk drive according to an embodiment of the present invention.

Reference will now be made in detail to the present preferred embodiments of the invention, examples of which are illustrated in the accompanying drawings. Wherever possible, the same reference numbers are used in the drawings and the description refers to the same or the like parts.

Referring to FIG. 1, a flow chart of a power saving method for an optical disk drive of a rugged electronic device according to an embodiment of the present invention is shown.

The rugged electronic device according to the embodiment of the present invention is a rugged laptop computer. The rugged electronic device has a watertight lid openably connected to the rugged electronic device and disposed outside an optical disk drive. The common watertight lid has a sealant, such as a rubber O-ring, to achieve a watertight effect when the watertight lid is closed. Such a watertight lid is well known by a person having ordinary skill in the art, the watertight lid is operated by a user manually. The connection between the watertight lid and the rugged electronic device is a simple mechanical connection without any electronic component. Furthermore, the optical disk drive of the rugged electronic device is usually in a removable module. Therefore, in order to achieve the watertight effect, the watertight lid is usually a component disposed on the rugged electronic device instead of disposed on the optical disk drive. A sensor is disposed on the rugged electronic device in the present invention and in a movement range of the watertight lid, and the sensor is used to sense whether the watertight lid is in an open state or a closed state. The optical disk drive is electrically connected to a power switch, and the power switch is electrically connected to a power supply of the rugged electronic device.

The optical disk drive has at least two operation modes, namely, a normal operation mode, and an energy saving operation mode. In the normal operation mode, the rugged electronic device provides power required by the operation of the optical disk drive. In the energy saving operation mode, the rugged electronic device cut off the power required by the operation of the optical disk drive. In this way, the optical disk drive does not consume the electrical power of the rugged electronic device when the optical disk drive is idle.

After the rugged electronic device completes a booting process, the optical disk drive is set to be in the normal operation mode. In this time, the sensor detects whether currently the watertight lid is in a closed state (Step 100).

When the sensor detects that the watertight lid is in the closed state, a read/write head of the optical disk drive detects whether an optical disk exists in the optical disk drive (Step 110). When the sensor detects that the watertight lid is in the open state, the procedure enters Step 160.

When the read/write head of the optical disk drive confirms that no optical disk exists, a timing mechanism of a controller in the rugged electronic device begins to time for a predetermined period of time (Step 120). The predetermined time of the controller may be set by the user.

Next, during the timing period of the controller, the controller confirms whether an optical disk drive start command is received (Step 130).

When the controller confirms that no optical disk drive start command is received, the controller continues to confirm whether the predetermined time is reached (Step 140). When the controller confirms that the optical disk drive start command is received, the procedure enters Step 160.

After the predetermined time is reached and the controller confirms that no optical disk drive start command is received, the controller sends out a first control signal to the power switch to turn off a loop between the power supply and the optical disk drive (Step 150). At this time, the optical disk drive is set to be in the energy saving operation mode. If the predetermined time is not reached, the procedure returns to Step 130 in which the controller continues to confirm whether the optical disk drive start command is received.

When the controller confirms that the optical disk drive start command is received, the controller sends out a second control signal to the power switch to enable the connection between the power supply and the optical disk drive (Step 160). At this time, the optical disk drive is set to be in the normal operation mode. The step of confirming whether the optical disk drive start command is received can be independent of all the above steps to periodically confirm whether the optical disk drive start command is received. No matter in which state or which step is being performed, once the optical disk drive start command is received, the controller sends out the second control signal to the power switch to turn on the power supply and the optical disk drive.

The aforementioned optical disk drive start command can be a hardware signal sent by a button or a software command running under an operating system. No matter the software commands or hardware signals correspond to an operation of starting the disk of the optical disk drive or an optical disk playing program performs a specific process, such a signal or instruction can be used as a source of the optical disk drive start command, as long as the signal or command has something to do with any use of the optical disk drive.

Figure 2:
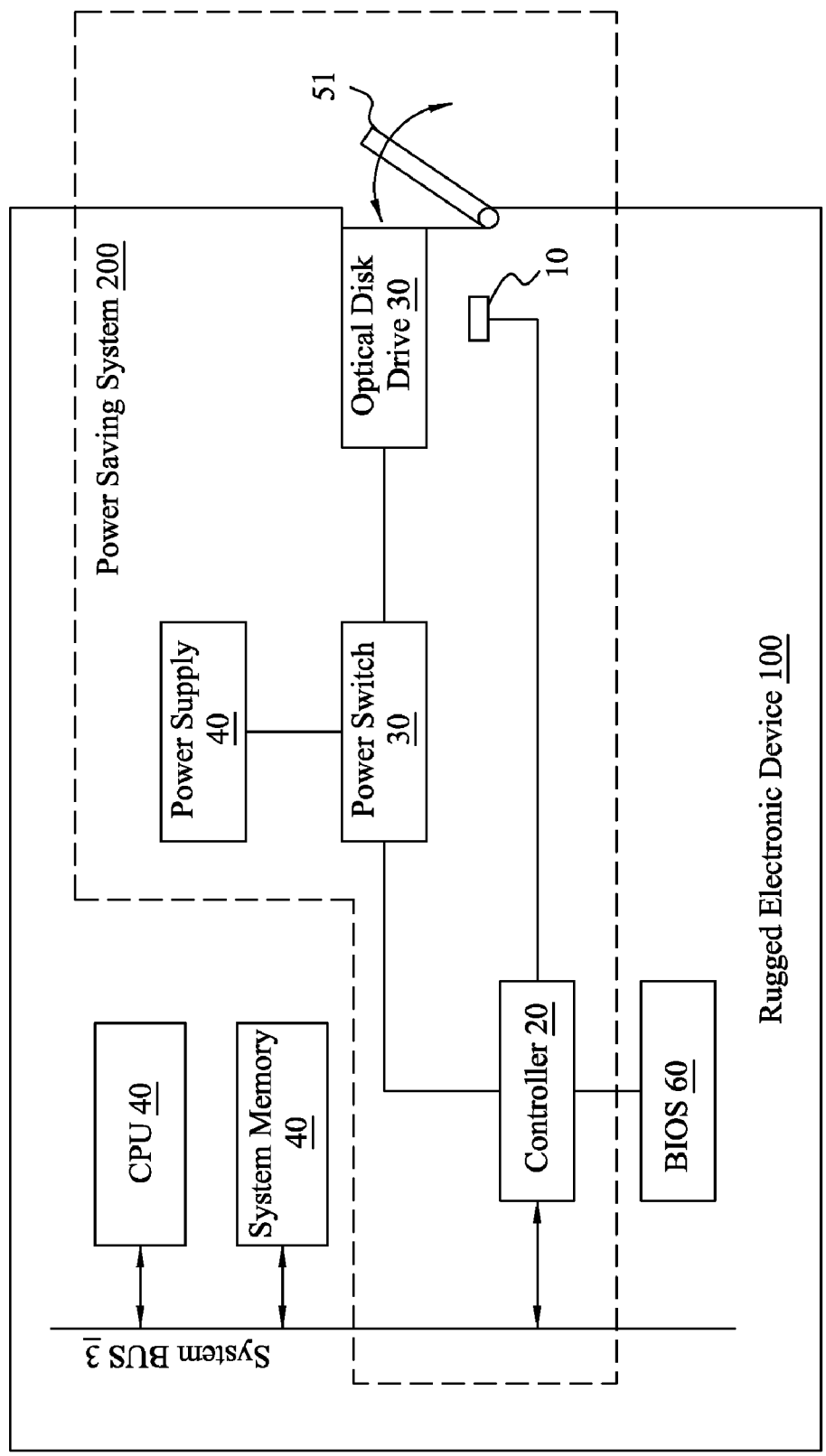
FIG. 2 is a block diagram of a power saving system for the optical disk drive according to an embodiment the present invention.

Referring to FIG. 2, a block diagram of a power saving system 200 for the optical disk drive of the rugged electronic device according to the embodiment of the present invention is shown. As shown in FIG. 2, the power saving system 200 for the optical disk drive includes a sensor 10, a controller 20, a power switch 30, a power supply 40, and an optical disk drive 50. This power saving system 200 for the optical disk drive is installed on the rugged electronic device 100. The rugged electronic device 100 includes a system bus 3 connected to a central processing unit (CPU) 1, a system memory 2, the controller 20, and so on. The rugged electronic device 100 further includes other modules such as a display module and an input module, and will not be described herein.

The sensor 10 is provided to detect a position of a watertight lid 51 outside the optical disk drive 50 and generates a first detection signal corresponding to that the watertight lid 51 is in a closed state or a second detection signal corresponding to that the watertight lid 51 is in an open state. Generally, the watertight lid 51 includes a sealant, such as a rubber O-ring., and the watertight lid 51 is openably connected to one side of the rugged electronic device. The sensor 10 can be, for example, a micro switch or an electromagnetic switch disposed adjacent to the watertight lid 51 on the rugged electronic device.

The controller 20 is connected to the sensor 10, and also connected to the CPU 1, and the system memory 2 of the rugged electronic device 100 via the system bus 3. The controller 20 has a timing mechanism. When the controller 20 receives the first detection signal and confirms that no optical disk exists in the optical disk drive 50, the timing mechanism is triggered to begin to time for a predetermined period of time. After the predetermined time is reached, the controller 20 generates a first control signal. When the controller 20 confirms that an optical disk exists in the optical disk drive 50, the controller 20 generates a second control signal.

The power switch 30 is electrically connected to the optical disk drive 50, the power supply 40, and the controller 20. The power switch 30 cuts off an electrical connection between the power supply 40 and the optical disk drive 50 when receiving the first control signal. The power switch 30 enable the electrical connection between the power supply 40 and the optical disk drive 50 when receiving the second control signal.

The power supply 40 is electrically connected to the power switch 30. The power supply 40 may be, for example, an internal battery or an external direct current (DC) power supply.

The optical disk drive 50 is electrically connected to the power switch 30 and is disposed on one side of the rugged electronic device. The optical disk drive 50 is removably inserted into one side of the rugged electronic device or fixed disposed on one side of the rugged electronic device by embedding. The connected watertight lid 51 is located outside the optical disk drive 50 and openably disposed on the rugged electronic device. The sealant of the watertight lid 51 provides a watertight effect when the watertight lid 51 is closed. The watertight lid 51 connected to the rugged electronic device can be fastened by a screw and opened by loosening the screw, or be pulled to be open or pressed to be latched and closed tight by a user manually. The connection between the watertight lid 51 and the rugged electronic device is a simple mechanical structure. The sensor 10 is disposed on the rugged electronic device and in a movement range of the watertight lid 51, and the sensor 10 is provided to sense whether the watertight lid 51 is in an open state or a closed state. The optical disk drive 50 is electrically connected to the power switch 30, and the power switch 30 is electrically connected to the power supply 40 in the rugged electronic device. The optical disk drive 50 has at least two operation modes, namely, a normal operation mode, and an energy saving operation mode. In the normal operation mode, the rugged electronic device provides a power supply required by the operation of the optical disk drive 50. In the energy saving operation mode, the rugged electronic device turns off the power supply required by the operation of the optical disk drive 50. In this way, the optical disk drive 50 does not consume the power of the rugged electronic device during a standby state.

A basic input output system (BIOS) 60 is electrically connected to the controller 20. The BIOS 60 provides an operation interface for the user to set the aforementioned predetermined time.

Figure 3:
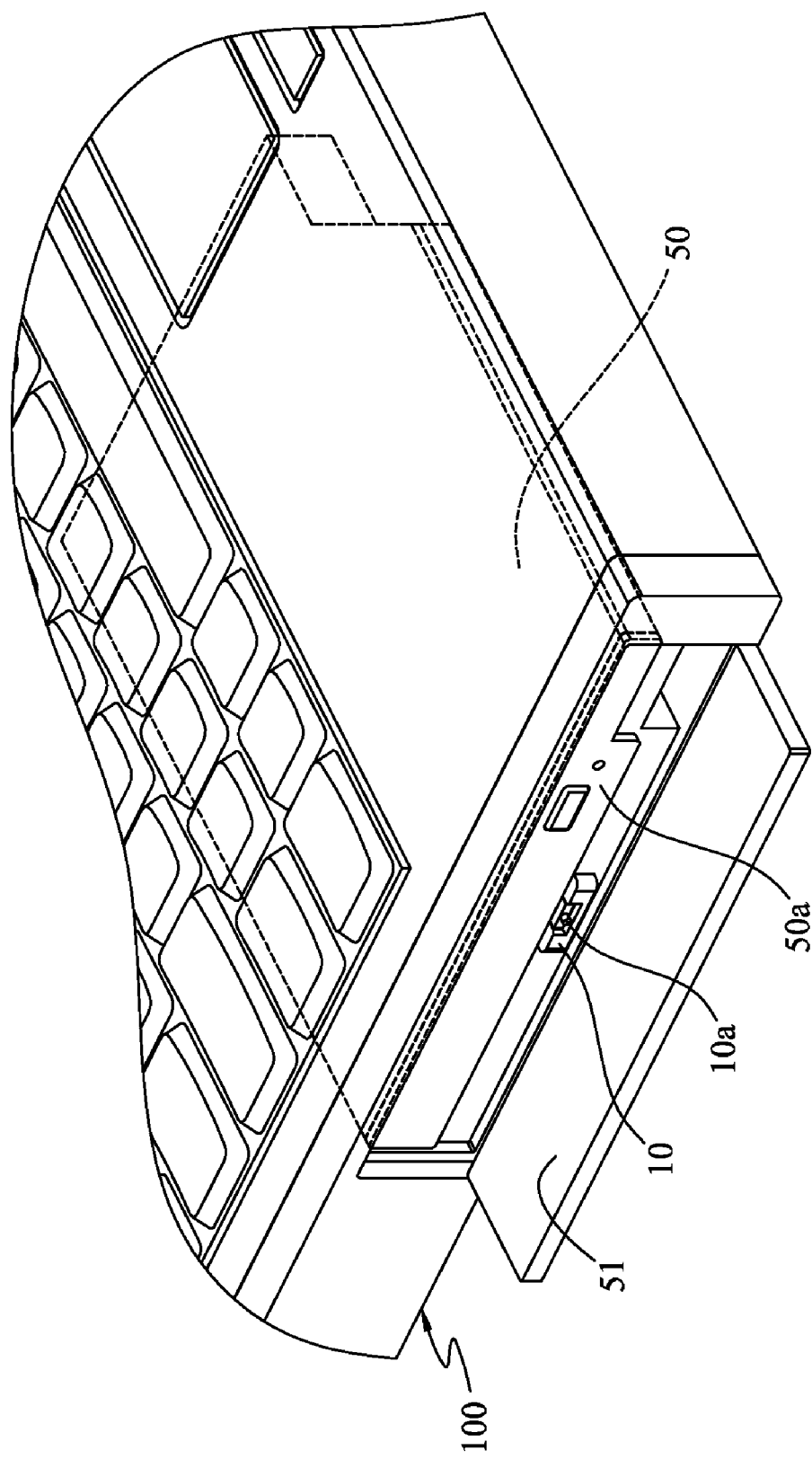
FIG. 3 is a partial perspective view of a rugged electronic device according to an embodiment of the present invention.

FIG. 3 is a partial perspective view of the rugged electronic device according to the embodiment of the present invention. As shown in FIG. 3, the optical disk drive 50 on one side of the rugged electronic device 100, and the sensor 10 is disposed adjacent to the optical disk drive 50 and in the movement range of the watertight lid 51 (below the optical disk drive 50 in the figure). The watertight lid 51 is openably connected onto the rugged electronic device 100 and outside the optical disk drive 50 at one end thereof. Since a power saving control process of the optical disk drive 50 is the same as that in the embodiment of FIGS. 1 and 2, the sensing process of the sensor 10 is merely illustrated below.

Figure 4:
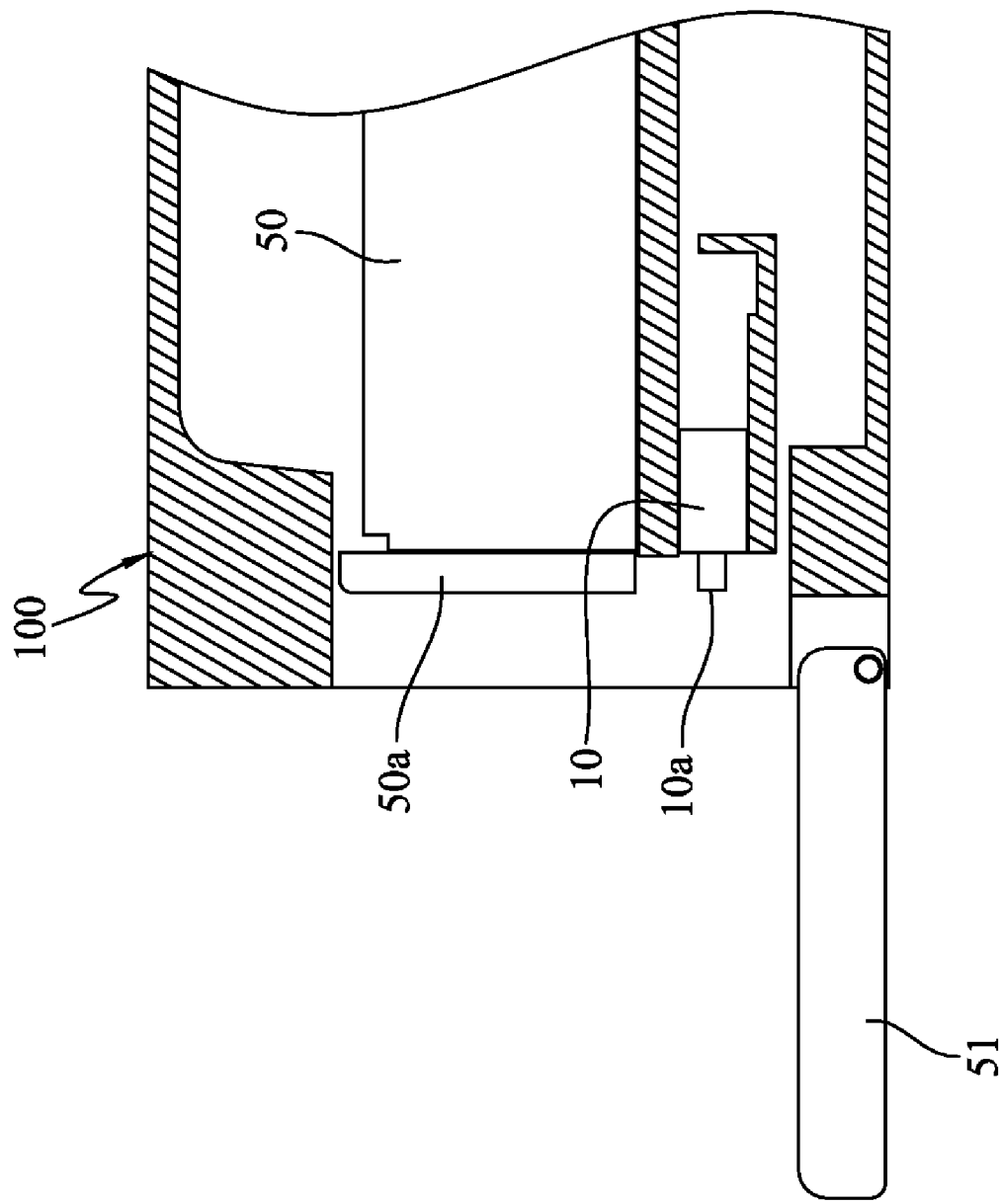
FIG. 4 is a partial side view of the rugged electronic device according to an embodiment of the present invention.

As shown in FIG. 4, the watertight lid 51 is connected to the rugged electronic device 100. The sensor 10 is disposed below the optical disk drive 50. The sensor 10 is a micro switch and has a protrusion 10a. In addition, the sensor 10 can also be an optical sensing switch or an electromagnetic switch.

When the watertight lid 51 is in the open state, a top end of the protrusion 10a protrudes on a panel 50a of the optical disk drive 50. At this time, the protrusion 10a of the sensor 10 is in a released state. Therefore, the sensor 10 generates the second detection signal corresponding to that the watertight lid 51 is in the open state to the controller 20.

When the watertight lid 51 is in the closed state, the top end of the protrusion 10a is pressed by the watertight lid 51. At this time, the protrusion 10a of the sensor 10 is in a pressed state. Therefore, the sensor 10 generates the first detection signal corresponding to that the watertight lid 51 is in the closed state to the controller 20.

In view of the above, the power saving method and system for the optical disk drive 50 of the rugged electronic device according to the present invention determines whether to turn off the supply power of the optical disk drive 50 by continuously detecting a operation state of the optical disk drive 50 after the optical disk drive 50 is started, and alleviates the problem that the optical disk drive 50 remains consuming the power of the rugged electronic device in the idle state or standby state.

What is claimed is:

1. A power saving method for an optical disk drive of a rugged electronic device, wherein the rugged electronic device having a watertight lid openably connected to the rugged electronic device and disposed outside the optical disk drive, the optical disk drive being electrically connected to a power switch, the power switch being electrically connected to a power supply, and the rugged electronic device having a controller for confirming whether an optical disk drive start command is received, the method comprising:

detecting, by a sensor, whether the watertight lid is in an open state or a closed state, wherein, when the lid is closed, the sensor generates and sends to the controller a first detection signal corresponding to a closed state of the watertight lid;

detecting, upon the closed state of the watertight lid, whether an optical disk exists in the optical disk drive with a read/write head of the optical disk drive;

timing a predetermined time by the controller when the read/write head confirms that no optical disk exists; and sending out a first control signal to the power switch by the controller to turn off an electrical connection between the power supply and the optical disk drive after the predetermined time is reached.

2. The power saving method as claimed in 1, wherein when the controller confirms that the optical disk drive start command is received, the controller sends out a second control signal to the power switch to enable the electrical connection between the power supply and the optical disk drive.

3. The power saving method as claimed in 1, wherein when the sensor detects that the watertight lid is in the closed state and the read/write head detects that the optical disk exists in the optical disk drive, the controller enables the electrical connection between the power supply and the optical disk drive.

4. The power saving method as claimed in 1, wherein the sensor is disposed on the rugged electronic device and located in a movement range of the watertight lid.

5. The power saving method as claimed in 1, wherein the sensor is a micro switch, an optical sensing switch, or an electromagnetic switch.

6. The power saving method as claimed in 1, wherein the predetermined time is set by a user through a basic input output system of the rugged electronic device.

7. The power saving method as claimed in 1, wherein when the predetermined time is not reached and it is confirmed that the optical disk drive start command is received, the controller enables the electrical connection between the power supply and the optical disk drive.

8. A power saving system for an optical disk drive of a rugged electronic device, comprising:

an optical disk drive, disposed on one side of the rugged electronic device, and selectively electrically connected to a power supply of the rugged electronic device, wherein the optical disk drive comprises a read/write head for detecting whether an optical disk exists in the optical disk drive;

a watertight lid openably connected to the rugged electronic device and disposed outside the optical disk drive;

a sensor, detecting a position state of the watertight lid and generating a first detection signal corresponding to a closed state of the watertight lid or a second detection signal corresponding to an open state of that the watertight lid;

a controller, electrically connected to the sensor for confirming an optical disk drive start command, wherein upon receipt of the first detection signal from the sensor and upon confirmation that no optical disk exists in the optical disk drive, the controller starts to time and generates a first control signal after a predetermined time is reached; and a power switch, electrically connected between the optical disk drive, the power supply, and the controller, wherein the power switch turns off an electrical connection between the power supply and the optical disk drive according to the first control signal.

9. The power saving system as claimed in claim 8, wherein when the read/write head confirms that the optical disk exists in the optical disk drive, the controller generates a second control signal to the power switch to enable the electrical connection between the power supply and the optical disk drive.

10. The power saving system as claimed in claim 8, wherein the sensor is disposed on the rugged electronic device and located in a movement range of the watertight lid.

11. The power saving system as claimed in claim 8, wherein the sensor is a micro switch, an optical sensing switch, or an electromagnetic switch.

12. The power saving system as claimed in claim 8, comprising a basic input output system electrically connected to the controller and enabling a user to set the predetermined time at will.

13. The power saving system as claimed in claim 8, wherein when the predetermined time is not reached and the controller confirms that an optical disk drive start command is received, the controller enables the electrical connection between the power supply and the optical disk drive.

* * * * *